(12) United States Patent
Feng et al.

(10) Patent No.: US 8,815,117 B2
(45) Date of Patent: Aug. 26, 2014

(54) MIXTURE FOR LIQUID CRYSTAL MEDIUM AND LIQUID CRYSTAL DISPLAY USING THE SAME

(71) Applicant: Shenzhen China Star Optoelectronics Technology Co., Ltd., Guangdong (CN)

(72) Inventors: Xing Feng, Shenzhen (CN); Xinhui Zhong, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 15 days.

(21) Appl. No.: 13/703,611

(22) PCT Filed: Oct. 16, 2012

(86) PCT No.: PCT/CN2012/083008
§ 371 (c)(1),
(2), (4) Date: Dec. 11, 2012

(87) PCT Pub. No.: WO2014/043961
PCT Pub. Date: Mar. 27, 2014

(65) Prior Publication Data
US 2014/0085596 A1  Mar. 27, 2014

(30) Foreign Application Priority Data
Sep. 21, 2012 (CN) .......................... 2012 1 0360684

(51) Int. Cl.
| | | |
|---|---|---|
| C09K 19/12 | (2006.01) | |
| C09K 19/52 | (2006.01) | |
| C09K 19/34 | (2006.01) | |
| C09K 19/30 | (2006.01) | |
| C09K 19/00 | (2006.01) | |
| C09K 19/02 | (2006.01) | |
| G02F 1/1333 | (2006.01) | |
| C09K 19/56 | (2006.01) | |
| C09K 19/04 | (2006.01) | |
| C09K 19/54 | (2006.01) | |

(52) U.S. Cl.
CPC ......... *C09K 19/56* (2013.01); *C09K 2019/0448* (2013.01); *C09K 2019/548* (2013.01); *C09K 2019/3422* (2013.01); *C09K 2019/122* (2013.01); *G02F 1/133365* (2013.01); *C09K 2019/3016* (2013.01); *C09K 19/3098* (2013.01)
USPC .............. 252/299.66; 252/299.01; 252/299.6; 252/299.61; 252/299.63; 428/1.1; 428/1.3; 349/1; 349/86; 349/182

(58) Field of Classification Search
CPC .................. C09K 19/544; C09K 2019/04478; C09K 19/2007; C09K 19/38; C09K 19/42; C09K 19/3402; C09K 19/46; C09K 2019/3463; C09K 19/3003; C09K 19/3001; C09K 19/3068; C09K 19/3028; C09K 19/12; C09K 19/126; C09K 19/44; C09K 19/02; C09K 19/20; C07C 2101/14; C07C 43/225; C07D 239/26; G02B 5/3083; G02B 5/3016; C08J 5/18; G02F 1/13363; G02F 1/13374; G02F 1/13718; G02F 1/133377
USPC ............... 252/299.01, 299.6, 299.61, 299.63, 252/299.66; 428/1.1, 1.3; 349/1, 86, 182
See application file for complete search history.

(56) References Cited

U.S. PATENT DOCUMENTS 8,313,669 B2 * 11/2012 Bernatz et al. ........... 252/299.01

* cited by examiner

*Primary Examiner* — Geraldina Visconti
(74) *Attorney, Agent, or Firm* — Andrew C. Cheng

(57) ABSTRACT

The present invention provides a mixture for liquid crystal medium and a liquid crystal display using the same. The mixture for liquid crystal medium comprises: at least one anisotropic liquid crystal material and a polymerizable monomer which will polymerize under UV irradiation. The weight percentage of the polymerizable monomer accounts for 0.1% to 1% of the total mixture for liquid crystal medium. In the mixture for liquid crystal medium and a liquid crystal display using the same according to the present invention, by using a polymerizable monomer which will polymerize under UV irradiation and the appropriate content ratio, the polymer bump with small size and good uniformity can be obtained within the mixture for liquid crystal medium after the polymerization, which avoids the bad liquid crystal alignment and the light spot occurred at the dark state of the liquid crystal panel, and then increases the response rapid of the liquid crystal panel to obtain high contrast ratio and stable mass production.

8 Claims, No Drawings

MIXTURE FOR LIQUID CRYSTAL MEDIUM AND LIQUID CRYSTAL DISPLAY USING THE SAME

This application claims priority to Chinese Patent Application Serial No. 201210360684.7, named as "mixture for liquid crystal medium and liquid crystal display using the same", filed on Sep. 21, 2012, the specification of which is incorporated herein by reference.

BACKGROUND OF THE INVENTION

1. Field of the Invention

The present invention relates to the field of liquid crystal display technology, and in particular to a mixture for liquid crystal medium and a liquid crystal display using the same.

2. The Related Arts

The liquid crystal used for twisted nematic (TN) or super twisted nematic (STN) liquid crystal display is positive-type liquid crystal. The long axis of the liquid crystal molecules is parallel to the surface of the substrate when the power is off. The alignment direction of the liquid crystal molecules on the surface of the substrate depends on the rubbing direction of alignment layer, which material usually is polyimide. The alignment directions of the surface of both substrates are perpendicular to each other. Hence, the molecules within the liquid crystal layer maintain in continuous twisted alignment state from the surface of one substrate to the surface of the other substrate. After the voltage is applied, the long axis of the liquid crystal molecules will tend to be aligned along the direction of the electric field. The drawback of the TN/STN type liquid crystal display is that it has small viewing angle, brightness difference and significant chromatic aberration under large viewing angle, which needs to be improved by the compensation film and thereby increases the manufacturing cost of the display.

Multi-domain vertical alignment (MVA) TFT-LCD using negative type liquid crystal and vertically aligned film material has solved the restrictions of the viewing angle of TN/STN display. When no voltage is applied, the long axis of the liquid crystal molecules is perpendicular to the surface of the substrate. When the voltage is applied, the liquid crystal molecules will topple down and the long axis of the liquid crystal molecules will tend to be aligned along the vertical direction of the electric field. In order to solve the problems of the viewing angle, a sub-pixel is divided into multiple regions, so that the liquid crystal molecules can topple down in different direction, which makes the views of the display seen in different directions tend to be the same. There are several ways to allow the liquid crystal molecules in the different regions to be oriented in different directions in one sub-pixel. The first one is to build a bump at the upper and lower substrates of the LCD by exposure and development, so that the liquid crystal molecules around the bump can produce a certain pre-inclined angle and topple down toward the fixed direction. The second one is to form predetermined pattern of indium tin oxide (ITO) pixel electrodes at the upper and lower substrates, which will generate an electric field with a certain inclined angle to control the toppling direction of the liquid crystal molecules in the different regions. This is called as patterned vertical alignment (PVA) technology. The third one is to form ITO slits at the TFT side of the LCD substrate and full ITO at the other side. And then add the polymerizable monomer into the liquid crystal medium. First, make the liquid crystal molecules topple down by an electric field, at the same time, irradiate the monomer with ultraviolet light to polymerize and form the polymer particles which can guide the toppling direction of the liquid crystal molecules. The polymer particles deposited on the surface of the substrate play the role of the alignment. This is called as polymer stabilized vertical alignment (PSVA).

The reaction rate of the polymerizable monomer, the size and the distribution of the polymer, the surface uniformity of the substrate, and the strength of the alignment force have major impacts on the optical properties of the panel and the stability of the production. In addition to the process conditions, these factors are mainly dependent on the molecular structure of the polymerizable monomer which directly determines the speed of the light reaction, the characteristics of the polymer and the strength of the alignment force to the liquid crystal. Because the conventional liquid crystal medium comprises alkenyl compound, it is beneficial to obtain a low rotational viscosity to improve the response of liquid crystal medium. The alkenyl compound within the liquid crystal medium will affect the polymerization reaction of the polymerizable monomer easily and then the alignment of the liquid crystal medium. Hence, in general, single polymerizable monomer is very difficult to make the factors mentioned above in a favorable situation. The actual situation often attends to one thing and loses track of another, such as good uniformity of the polymer accompanied with low alignment force, or strong alignment force accompanied with slow reaction rate and so on.

SUMMARY OF THE INVENTION

The technical issue to be solved by the present invention is to provide a mixture for liquid crystal medium, wherein by using a polymerizable monomer, the reaction rate of the polymerization reaction, the uniformity of the generated polymer and the strength of the alignment force can be balanced at the same time and reach a higher level.

The present invention further provides a liquid crystal display comprising the mixture for liquid crystal medium, wherein by using a polymerizable monomer, the reaction rate of the polymerization reaction of the monomer, the uniformity of the generated polymer and the strength of the alignment force can be balanced at the same time and reach a higher level, which improves the optical properties and overall performance of the panel and the stable mass production.

In order to solve the technical issue, the embodiment according to the present invention provides a mixture for liquid crystal medium comprising: a liquid crystal material and a polymerizable monomer which will polymerize under UV irradiation, the liquid crystal material comprising an alkenyl compound which is stable to the polymerization reaction during the polymerization of the polymerizable monomer, the weight percentage of the polymerizable monomer accounting for 0.1% to 1% of the total mixture for liquid crystal medium; the polymerizable monomer defined by the following structural formula:

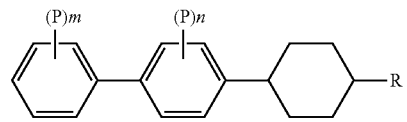

formula I wherein, P represents a polymerizable group, which is selected from the group consisting of methacrylate group or acrylate group; m and n represent the number of the polymerizable groups Ps connected to the same aromatic ring, m represents 2; n represents 1; wherein the P is methacrylate group when the Ps in formula I are different; R represents the straight chain or branched chain alkenyl containing number of carbon atoms from 2 to 9.

Wherein, any hydrogen on the aromatic ring in the structural formulas of the polymerizable monomer may be substituted by the group of —F, —Cl, —Br, methyl or —CN.

Wherein, the alkenyl compound is defined by the following structural formulas:

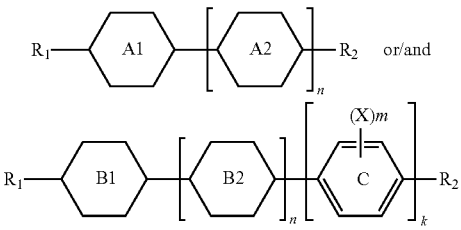

wherein,

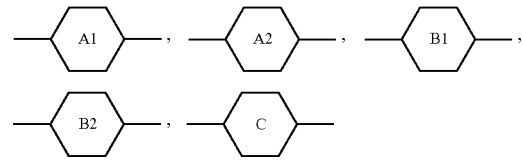

independently represents:

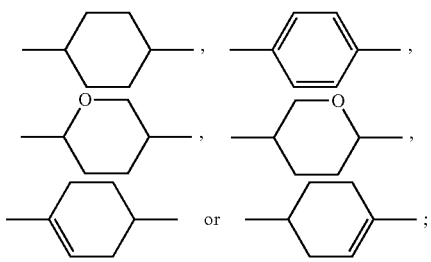

R1 represents the straight chain or branched chain alkenyl containing number of carbon atoms from 2 to 9;
R2 represents the straight chain or branched chain alkyl containing number of carbon atoms from 1 to 12;
X independently represents H、F、Cl、$OCF_3$ or $CF_3$;
m represents from 1 to 4;
n and k respectively represents from 0 to 3.

Correspondingly, another embodiment according to the present invention further provides a liquid crystal display comprising: a upper substrate and a lower substrate which are parallel with each other, and a mixture for liquid crystal medium provided between the upper substrate and the lower substrate, the mixture for liquid crystal medium comprising: a liquid crystal material and a polymerizable monomer which will polymerize under UV irradiation, the liquid crystal material comprising an alkenyl compound which is stable to the polymerization reaction during the polymerization of the polymerizable monomer, the weight percentage of the polymerizable monomer accounting for 0.1% to 1% of the total mixture for liquid crystal medium; the polymerizable monomer defined by the following structural formula:

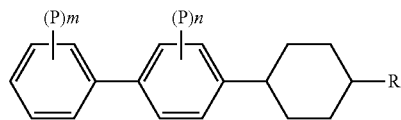

formula I wherein, P represents a polymerizable group, which is selected from the group consisting of methacrylate group or acrylate group; m and n represent the number of the polymerizable groups Ps connected to the same aromatic ring, m represents 2; n represents 1; wherein the P is methacrylate group when the Ps in formula I are different; R represents the straight chain or branched chain alkenyl containing number of carbon atoms from 2 to 9.

Wherein, any hydrogen on the aromatic ring in the structural formulas of the polymerizable monomer may be substituted by the group of —F, —Cl, —Br, methyl or —CN.

Wherein, the alkenyl compound is defined by the following structural formulas:

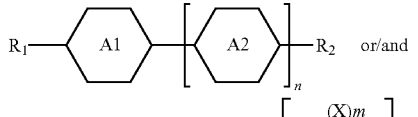

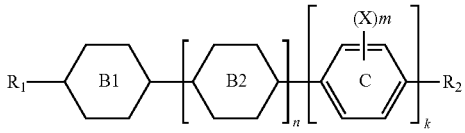

wherein,

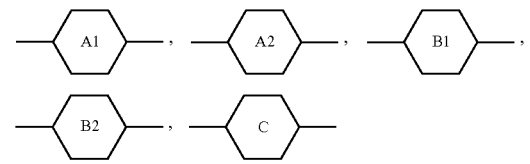

independently represents:

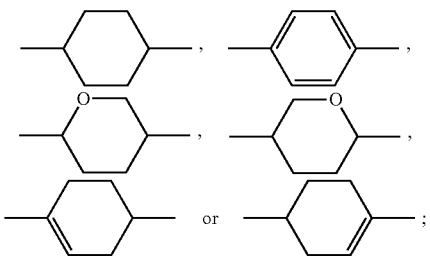

R1 represents the straight chain or branched chain alkenyl containing number of carbon atoms from 2 to 9;
R2 represents the straight chain or branched chain alkyl containing number of carbon atoms from 1 to 12;
X independently represents H、F、Cl、$OCF_3$ or $CF_3$;
m represents from 1 to 4;
n and k respectively represents from 0 to 3.

The embodiment according to the present invention has the beneficial effects as follow:
the mixture for liquid crystal medium according to the present invention, by using a polymerizable monomer which will polymerize under UV irradiation, the polymer bump with small size and good uniformity can be obtained after the polymerization, which avoids the bad liquid crystal alignment and the light spot occurred at the dark state of the liquid crystal panel, and then increases the response rapid of the liquid crystal panel to obtain high contrast ratio. It improves the optical properties and overall performance of the panel and the stable mass production when applied in the liquid crystal display.

DETAILED DESCRIPTION OF THE PREFERRED EMBODIMENTS

In order to further illustrate technical means and effects thereof according to the present invention, the accompanying drawings and the following detailed descriptions are the preferred embodiments of the present invention.

The present invention provides a mixture for liquid crystal medium used for liquid crystal display. The mixture for liquid crystal medium comprises: a liquid crystal material and a polymerizable monomer which will polymerize under UV irradiation. The liquid crystal material comprises an alkenyl compound which is stable to the polymerization reaction during the polymerization of the polymerizable monomer. The weight percentage of the polymerizable monomer accounts for 0.1% to 1% of the total mixture for liquid crystal medium.

Wherein, the polymerizable monomer is composed of two benzene rings connected directly with each other. At least one benzene ring can be directly connected with polymerizable group.

In one embodiment, the polymerizable monomer is defined by the following structural formula:

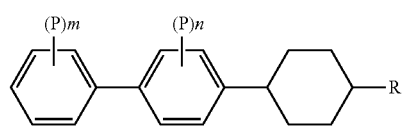

formula I wherein, P represents a polymerizable group, which is selected from the group consisting of methacrylate group or acrylate group; m and n represent the number of the polymerizable groups Ps connected to the same aromatic ring, m represents 2; n represents 1; wherein the P is methacrylate group when the Ps in formula I are different; R represents the straight chain or branched chain alkenyl containing number of carbon atoms from 2 to 9.

Any hydrogen on the aromatic ring in the structural formulas of the polymerizable monomer may be substituted by the group of —F, —Cl, —Br, methyl or —CN.

In one embodiment, the weight percentage of the polymerizable monomer accounts for 0.3% of the total mixture for liquid crystal medium.

The alkenyl compound is defined by the following structural formulas:

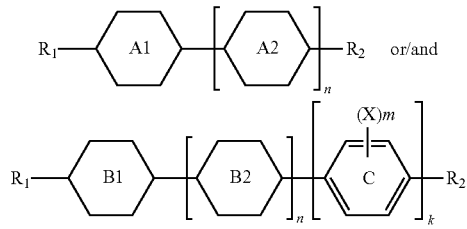

wherein,

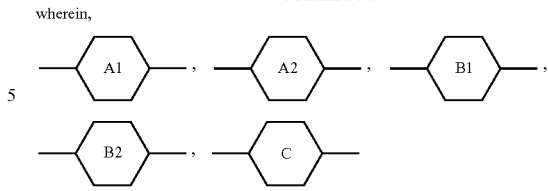

independently represents:

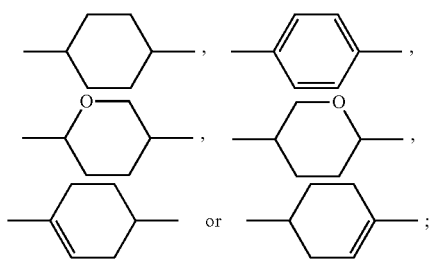

R1 represents the straight chain or branched chain alkenyl containing number of carbon atoms from 2 to 9;

R2 represents the straight chain or branched chain alkyl containing number of carbon atoms from 1 to 12;

X independently represents H、F、Cl、$OCF_3$ or $CF_3$;

m represents from 1 to 4;

n and k respectively represents from 0 to 3.

The preferred embodiment according to the present invention is described as follows.

Embodiment 1

The mixture for liquid crystal medium is chosen from negative-type liquid crystal material and a polymerizable monomer as follows:

The structural formula of the liquid crystal material is

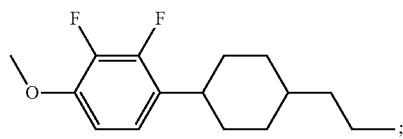

The structural formula of the polymerizable monomer, which is RM-A1, is as follows:

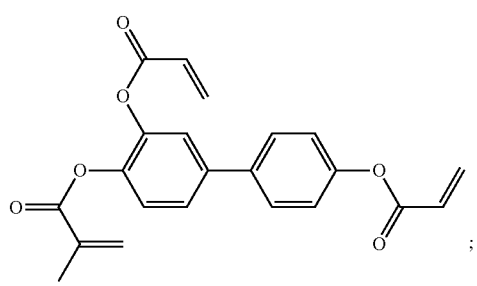 [SMILES: C=CC(=O)Oc1ccc(-c2ccc(OC(=O)C(=C)C)c(OC(=O)C=C)c2)cc1 ; ";"]

The content of RM-A1 accounts for 1000 ppm of the liquid crystal medium layer. In the mixture for liquid crystal medium, the polymer bump, formed after ultraviolet irradiation, has small and uniform size, and the light spots won't occur at the dark state.

Embodiment 2

The mixture for liquid crystal medium is chosen from negative-type liquid crystal material and a polymerizable monomer as follows:

The structural formula of the liquid crystal material is

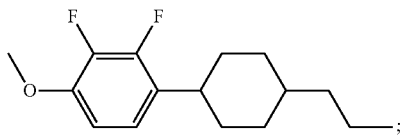

The structural formula of the polymerizable monomer, which is RM-A2, is as follows:

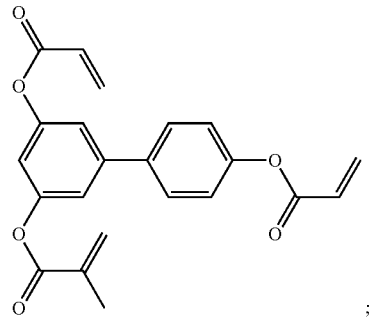 [SMILES: C=CC(=O)Oc1ccc(-c2cc(OC(=O)C=C)cc(OC(=O)C(=C)C)c2)cc1 ; ";"]

The content of RM-A2 accounts for 3000 ppm of the liquid crystal medium layer. In the mixture for liquid crystal medium, the polymer bump, formed after ultraviolet irradiation, has small and uniform size, and the light spots won't occur at the dark state.

Embodiment 3

The mixture for liquid crystal medium is chosen from negative-type liquid crystal material and a polymerizable monomer as follows:

The structural formula of the liquid crystal material is

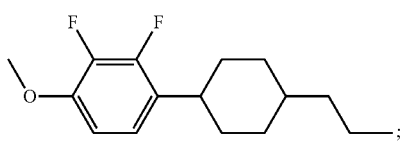 [SMILES: CCCC1CCC(c2ccc(OC)c(F)c2F)CC1]

The structural formula of the polymerizable monomer, which is RM-A3, is as follows:

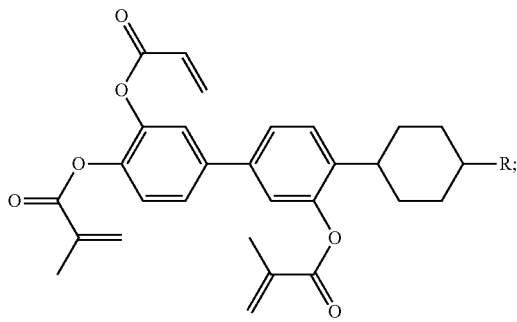

The content of RM-A3 accounts for 10000 ppm of the liquid crystal medium layer. In the mixture for liquid crystal medium, the polymer bump, formed after ultraviolet irradiation, has small and uniform size, and the light spots won't occur at the dark state.

Embodiment 4

The mixture for liquid crystal medium is chosen from negative-type liquid crystal material and a polymerizable monomer as follows:

The structural formula of the liquid crystal material is

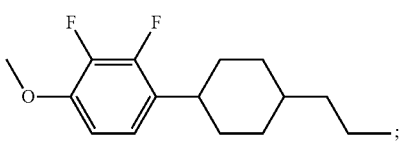 [SMILES: CCCC1CCC(c2ccc(OC)c(F)c2F)CC1]

The structural formula of the polymerizable monomer, which is RM-A4, is as follows:

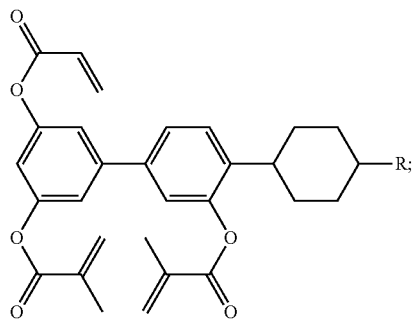

The content of RM-A4 accounts for 3000 ppm of the liquid crystal medium layer. In the mixture for liquid crystal medium, the polymer bump, formed after ultraviolet irradiation, has small and uniform size, and the light spots won't occur at the dark state.

In summary, the mixture for liquid crystal medium used for liquid crystal display according to the present invention, by using a polymerizable monomer which will polymerize under UV irradiation, can control the size and the uniformity of the polymer bump formed by polymerization, which avoids the bad liquid crystal alignment and the light spot occurred at the dark state of the liquid crystal panel, and then obtains good optical performance of the liquid crystal panel, such as high contrast ratio and high response speed.

The mixture for liquid crystal medium according to the present invention can be applied in display. The liquid crystal display according to the present invention uses the mixture for liquid crystal medium mentioned above, which comprises a upper substrate and a lower substrate which are parallel with each other, and a mixture for liquid crystal medium provided between the upper substrate and the lower substrate. The mixture for liquid crystal medium is the mixture for liquid crystal medium according to the present invention mentioned above and not be repeated here. By using the polymerizable monomer in the mixture for liquid crystal medium, the reaction rate of the polymerization reaction, the uniformity of the generated polymer and the strength of the alignment force can be balanced at the same time and reach a higher level. That is, while the reaction rate is quick, the uniformity of the generated polymer and the strength of the alignment force are also high, which improves the optical properties and overall performance of the panel and the stable mass production.

It is to be understood that many other possible modifications and variations can be made by those skilled in the art without departing from the spirit and scope of the invention as hereinafter claimed, and those modifications and variations are considered encompassed in the scope of protection defined by the clams of the present invention.

What is claimed is:

1. A mixture for liquid crystal medium comprising: a liquid crystal material and a polymerizable monomer which will polymerize under UV irradiation, the liquid crystal material comprising an alkenyl compound which is stable to the polymerization reaction during the polymerization of the polymerizable monomer, the weight percentage of the polymerizable monomer accounting for 0.1% to 1% of the total mixture for liquid crystal medium; the polymerizable monomer defined by the following structural formula:

formula I

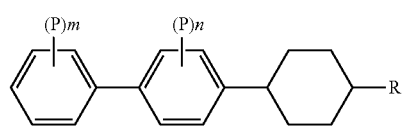

wherein, P represents a polymerizable group, which is selected from the group consisting of methacrylate group or acrylate group; m and n represent the number of the polymerizable groups Ps connected to the same aromatic ring, m represents 2; n represents 1; wherein the Ps are not methacrylate group simultaneously; R represents the straight chain or branched chain alkenyl containing number of carbon atoms from 2 to 9.

2. The mixture for liquid crystal medium as claimed in claim 1, characterized in that any hydrogen on the aromatic ring in the structural formula of the polymerizable monomer may be substituted by the group of —F, —Cl, —Br, methyl or —CN.

3. The mixture for liquid crystal medium as claimed in claim 1, characterized in that the alkenyl compound is defined by the following structural formulas:

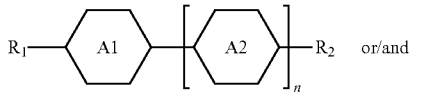
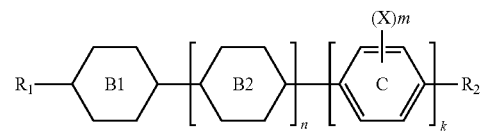

wherein,

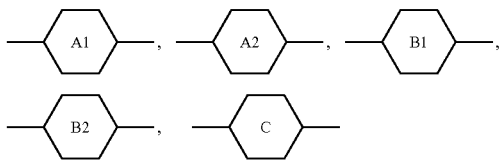

independently represents:

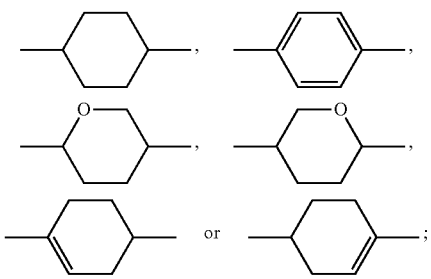

R1 represents the straight chain or branched chain alkenyl containing number of carbon atoms from 2 to 9;

R2 represents the straight chain or branched chain alkyl containing number of carbon atoms from 1 to 12;

X independently represents H、F、Cl、$OCF_3$ or $CF_3$;

m represents from 1 to 4;

n and k respectively represents from 0 to 3.

4. The mixture for liquid crystal medium as claimed in claim 2, characterized in that the alkenyl compound is defined by the following structural formulas:

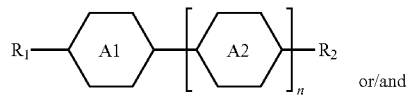
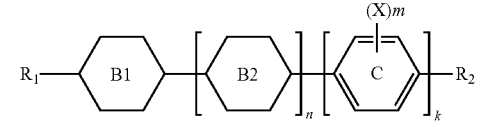

wherein,

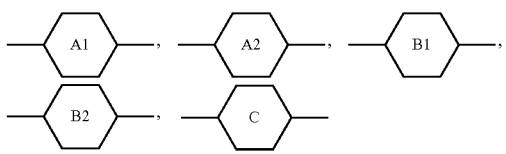

independently represents:

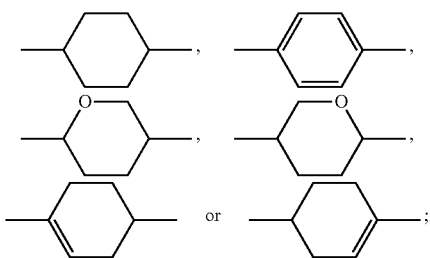

R1 represents the straight chain or branched chain alkenyl containing number of carbon atoms from 2 to 9;

R2 represents the straight chain or branched chain alkyl containing number of carbon atoms from 1 to 12;

X independently represents H、F、Cl、$OCF_3$ or $CF_3$;

m represents from 1 to 4;

n and k respectively represents from 0 to 3.

5. A liquid crystal display comprising: a upper substrate and a lower substrate which are parallel with each other, and a mixture for liquid crystal medium provided between the upper substrate and the lower substrate, the mixture for liquid crystal medium comprising: a liquid crystal material and a polymerizable monomer which will polymerize under UV irradiation, the liquid crystal material comprising an alkenyl compound which is stable to the polymerization reaction during the polymerization of the polymerizable monomer, the weight percentage of the polymerizable monomer accounting for 0.1% to 1% of the total mixture for liquid crystal medium; the polymerizable monomer defined by the following structural formula:

formula I

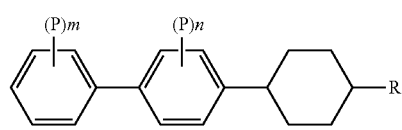

wherein, P represents a polymerizable group, which is selected from the group consisting of methacrylate group or acrylate group; m and n represent the number of the polymerizable groups Ps connected to the same aromatic ring, m represents 2; n represents 1; wherein the Ps are not methacrylate group simultaneously; R represents the straight chain or branched chain alkenyl containing number of carbon atoms from 2 to 9.

6. The liquid crystal display as claimed in claim 5, characterized in that any hydrogen on the aromatic ring in the structural formulas of the polymerizable monomer may be substituted by the group of —F, —Cl, —Br, methyl or —CN.

7. The liquid crystal display as claimed in claim 5, characterized in that the alkenyl compound is defined by the following structural formulas:

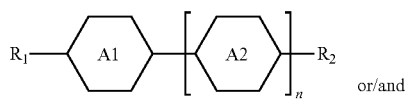

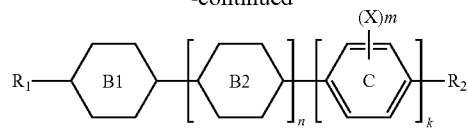

wherein,

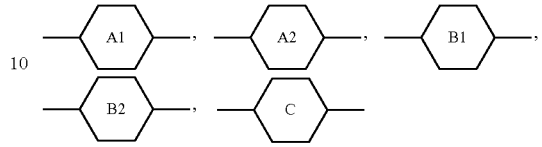

independently represents:

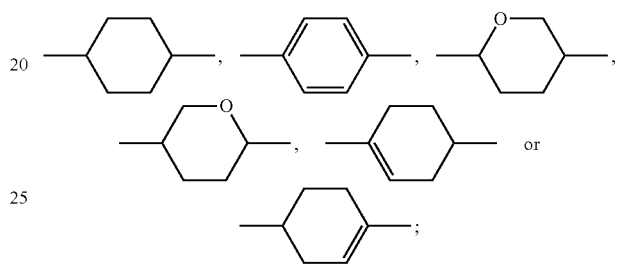

R1 represents the straight chain or branched chain alkenyl containing number of carbon atoms from 2 to 9;

R2 represents the straight chain or branched chain alkyl containing number of carbon atoms from 1 to 12;

X independently represents H、F、Cl、$OCF_3$ or $CF_3$;

m represents from 1 to 4;

n and k respectively represents from 0 to 3.

8. The liquid crystal display as claimed in claim 6, characterized in that the alkenyl compound is defined by the following structural formulas:

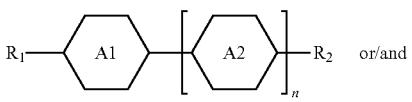

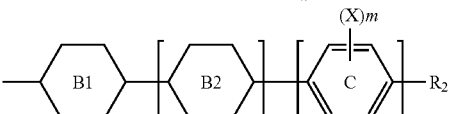

wherein,

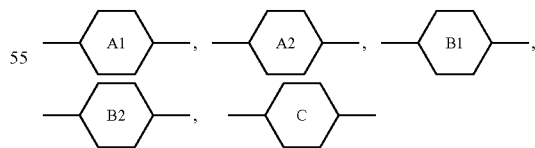

independently represents:

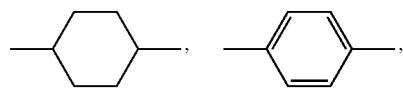

-continued
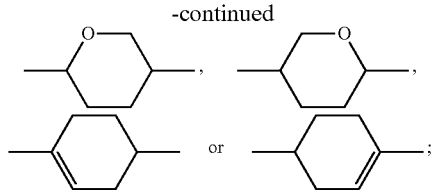
R1 represents the straight chain or branched chain alkenyl containing number of carbon atoms from 2 to 9;
R2 represents the straight chain or branched chain alkyl containing number of carbon atoms from 1 to 12;
X independently represents H、F、Cl、$OCF_3$ or $CF_3$;
m represents from 1 to 4;
n and k respectively represents from 0 to 3.
* * * * *